United States Patent [19]
Keene

[11] 3,807,360
[45] Apr. 30, 1974

[54] ANTI-PICK DEVICE FOR POULTRY

[76] Inventor: Richard Keene, Russells Farm Cottage, Hambleden, near Henley-on-Thames, England

[22] Filed: Oct. 13, 1972

[21] Appl. No.: 297,201

[30] Foreign Application Priority Data
Oct. 26, 1971 Great Britain..................... 49713/71

[52] U.S. Cl.............................................. 119/97 R
[51] Int. Cl............................................ A01k 37/00
[58] Field of Search................... 119/97 R, 132, 135

[56] References Cited
UNITED STATES PATENTS
| | | | |
|---|---|---|---|
| 2,450,587 | 10/1948 | Elgersma........................... | 119/97 R |
| 3,446,186 | 5/1969 | Hardwood et al. ............... | 119/97 R |
| 2,286,001 | 6/1942 | Nichols et al..................... | 119/97 R |

FOREIGN PATENTS OR APPLICATIONS
| | | | |
|---|---|---|---|
| 841,525 | 7/1960 | Great Britain.................... | 119/97 R |

*Primary Examiner*—Hugh R. Chamblee
*Attorney, Agent, or Firm*—Scrivener Parker Scrivener & Clarke

[57] ABSTRACT

An anti-pick device for poultry is constituted by a rod of plastics material having a uniform cross-section throughout its length and shaped to provide an elongated ring with a narrow gap between the ends of the rod at the centre of the length of the ring. The ring is attached to a bird by expanding the ring to increase the size of the gap, engaging the ring around the upper jaw of the bird's beak with the side of the ring opposite to the gap disposed between the upper and lower jaws, and releasing the ring so that it resiliently contracts with the two ends of the rod arranged in the bird's nostrils.

1 Claim, 4 Drawing Figures

PATENTED APR 30 1974　　　　　　　　　　　　　　　3,807,360

ANTI-PICK DEVICE FOR POULTRY

This invention relates to an anti-pick device for poultry, that is a device for preventing the plucking of feathers by poultry of all kinds, including game birds such as pheasants. Feather picking by pheasant poults, in particular, can cause serious loss, as the release to the wild of poults with deficient plumage can result in heavy mortality.

It is already known to provide an anti-pick device which can be attached to the upper jaw of the beak by engaging a portion of the device in the bird's nostrils, another portion of the device then lying between the upper and lower jaws, thus preventing the beak from being fully closed. The present invention provides an improved device of this character which avoids the defects of previously known devices, being very simple in construction, easy and cheap to manufacture, easy to apply and remove even without the use of tools, very light and causing minimum inconvenience to the bird, durable and reusable.

An anti-pick device in accordance with the invention is constituted by a ring of oval or other elongated form made of resiliently flexible plastics materials and having a split or gap in the centre of one of its longer sides, so that the ring can be sprung open to increase the gap between the free ends of the device, thereby allowing the ring to be engaged around the upper jaw of the bird's beak with the unbroken longer side of the ring disposed between the jaws and the two free ends held engaged in the bird's nostrils by the resilient recontraction of the ring. Once applied, the device remains securely in position, but it can easily be removed when desired, without risk of damage either to the bird or to the device, by again springing the ring open sufficiently to withdraw the free ends from the nostrils. The device is preferably made of nylon by a process of injection moulding, but the invention is not limited to this particular material or method of manufacture.

The precise form and dimensions of the device must of course be chosen to suit the birds on which it is intended to be used. By way of example only, a device of the form and dimensions now to be described has been found suitable for fitting to pheasant poults aged about three weeks and can be left in position until the birds are ready to be released to the wild.

The particular device in question is shown in the accompanying drawing, in which.

Figure 1:
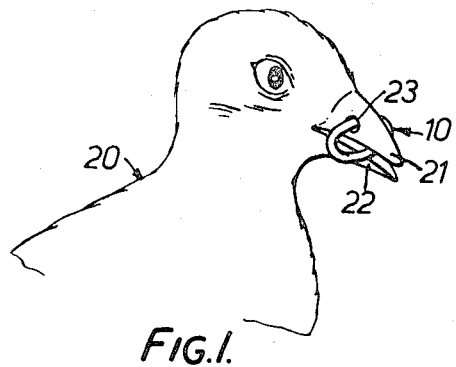
FIG. 1 shows a pheasant poult fitted with the device.
Figure 2:
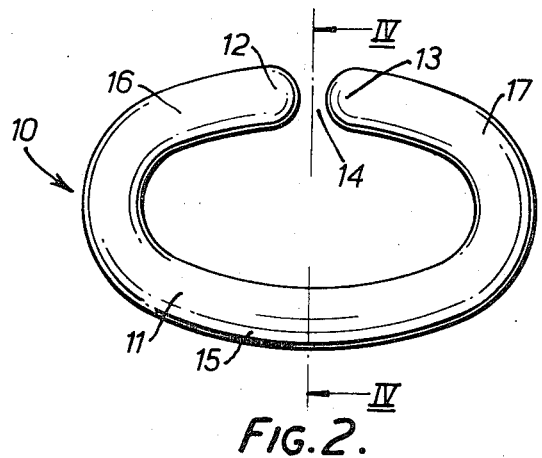
FIG. 2 is a front view on an enlarged scale of the device alone.
Figure 4:
FIG. 4 is a sectional view, taken on the line IV—IV of FIG. 2.
Figure 3:
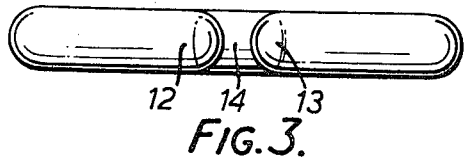
FIG. 3 is a plan view of the device of FIG. 2.

Referring to the drawing, the anti-pick device, indicated generally by the reference 10, is made in one piece from nylon by injection moulding. It has the form of a rod 11 of circular section some 1/16 inch (1,5 mm) in diameter, having its two ends 12, 13 smoothly rounded off, the rod being curved so that these two ends lie closely adjacent one another, separated only by a narrow gap 14, and the rod has the form of an oval ring some ⅝ inch (15 mm) in overall length and ⅜ inch (9 mm) in overall width, with the gap 14 disposed in the centre of one of the longer sides of the ring, the opposite longer side 15 being continuous.

To apply the device manually to a pheasant poult 20, two parts of the ring lying on opposite sides of the gap 14 (for example the parts marked 16, 17) are grasped and pulled apart, thus increasing the gap between the free ends 12, 13. In this expanded state the ring is passed over the upper jaw 21 of the bird's beak, so that the side 15 of the ring lies between the jaw 21 and the lower jaw 22 and the free ends 12, 13 of the ring are adjacent the nostril openings 23 in the upper jaw. The ring is then released so that its resilient contraction engages the free ends 12, 13 in the bird's nostrils, thus securely retaining the ring in position as shown in FIG. 1.

While, as previously stated, the device can very easily be applied and removed without the use of tools, application and/or removal of the rings can be further facilitated by the provision of a suitable tool. Such a tool may have the general form of a pair of pliers whose jaws will move further apart when the handles are pressed together, the jaws being normally spaced far enough apart to pass on opposite sides of the bird's beak and being dimensioned to engage within the ring at opposite ends thereof. With the jaws of the device so engaged in the ring, pressure on the handles will expand the ring and hold it expanded while it is being placed in position or removed.

I claim:

1. An anti-pick device for poultry constituted by a single integrally formed member of resiliently flexible plastics material, said member having the form of a rod of substantially uniform cross-section having a thickness of approximately 1/16 inch throughout its length, shaped to provide an elongated ring lying in a single plane with the two ends of the rod positioned closely adjacent one another at the centre of the length of the ring, whereby the ring can be sprung open to allow the ring to be engaged around the upper jaw of the bird's beak with the central part of the rod extending between the upper and lower jaws of the beak, subsequent resilient contraction of the ring causing the ends of the rod to engage in the bird's nostrils.

* * * * *